(12) United States Patent
Tang et al.

(10) Patent No.: US 8,477,859 B2
(45) Date of Patent: Jul. 2, 2013

(54) SYSTEM AND METHOD FOR WIRELESS COMMUNICATIONS WITH CODEBOOK QUANTIZATION

(75) Inventors: Yang Tang, San Diego, CA (US); Pengfei Xia, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 523 days.

(21) Appl. No.: 12/730,064

(22) Filed: Mar. 23, 2010

(65) Prior Publication Data

US 2010/0239037 A1 Sep. 23, 2010

Related U.S. Application Data

(60) Provisional application No. 61/162,536, filed on Mar. 23, 2009.

(51) Int. Cl.
*H04L 27/28* (2006.01)
(52) U.S. Cl.
USPC ........... 375/260; 375/267; 375/299; 370/210; 370/203; 370/342; 708/607
(58) Field of Classification Search
CPC ........................ H04L 27/2647; H04L 5/0007
USPC ................. 375/260, 267, 299; 370/210, 203, 370/342; 708/607
See application file for complete search history.

(56) References Cited

U.S. PATENT DOCUMENTS

| | | | |
|---|---|---|---|
| 2006/0268623 A1 * | 11/2006 | Chae et al. | 365/189.01 |
| 2007/0098106 A1 * | 5/2007 | Khojastepour et al. | 375/267 |
| 2008/0256163 A1 * | 10/2008 | Clerckx et al. | 708/607 |

* cited by examiner

*Primary Examiner* — Shuwang Liu
*Assistant Examiner* — Ross Varndell
(74) *Attorney, Agent, or Firm* — Slater & Matsil, L.L.P.

(57) ABSTRACT

A system and method for wireless communications with codebook quantization are provided. A method for communications device operations includes estimating a channel between a controller and a mobile device, generating channel state information from the channel estimate, quantizing the channel state information by selecting a codeword from a rank n codebook based on a codeword selection mechanism, where n is a non-negative integer value, transmitting an index corresponding to the selected codeword and receiving a transmission from the controller. The transmission is precoded based on the index. The rank n codebook includes $2^K$ codewords with each codeword comprising n columns of a transformed base matrix of dimension $N_t \times N_t$, where K is a positive integer number representing a number of bits in the rank n codebook, and $N_t$ is a number of transmit antennas at the controller.

23 Claims, 3 Drawing Sheets

SYSTEM AND METHOD FOR WIRELESS COMMUNICATIONS WITH CODEBOOK QUANTIZATION

This application claims the benefit of U.S. Provisional Application No. 61/162,536, filed on Mar. 23, 2009, entitled "System and Method for Rank-1 and Rank-2 Codebook Generation," which application is hereby incorporated herein by reference.

TECHNICAL FIELD

The present invention relates generally to wireless communications, and more particularly to a system and method for wireless communications with codebook quantization.

BACKGROUND

In a wireless communications system, the communications system's capacity may be significantly improved when a transmitter has full or partial knowledge of a channel over which it will be transmitting. Information related to the channel may be referred to as channel state information (CSI). CSI may be obtained by the transmitter over a reverse feedback channel. A receiver of transmissions made by the transmitter may transmit CSI back to the transmitter over the reverse feedback channel.

SUMMARY

These technical advantages are generally achieved, by embodiments of a system and method for wireless communications with codebook quantization.

In accordance with an embodiment, a method communications device operations is provided. The method includes estimating a channel between a controller and a mobile device, generating channel state information from the channel estimate, and quantizing the channel state information by selecting a codeword from a rank n codebook based on a codeword selection mechanism, where n is a non-negative integer value. The method also includes transmitting an index corresponding to the selected codeword, and receiving a transmission from the controller. The transmission is precoded based on the index. The rank n codebook includes $2^K$ codewords with each codeword including n columns of a transformed base matrix of dimension $N_t \times N_t$, where K is a positive integer number representing a number of bits in the rank n codebook, and $N_t$ is a number of transmit antennas at the controller.

In accordance with an embodiment, a method for controller operation is provided. The method includes receiving an index from a communications device, the index corresponding to a codeword in a rank n codebook, and the codeword representing a quantized channel estimate, where n is a non-negative integer value representing a number of transmit antennas at the controller. The method also includes computing a precoding matrix from the codeword, precoding data to be transmitted to the communications device, the precoding being based on the precoding matrix, and transmitting the precoded data to the communications device. The rank n codebook includes $2^K$ codewords with each codeword including n columns of a transformed base matrix of dimension $N_t \times N_t$, where K is a positive integer number representing a number of bits in the rank n codebook, and $N_t$ is a number of transmit antennas at the controller.

In accordance with another embodiment, a communications device is provided. The communications device includes a channel estimate unit coupled to a signal input, a quantization unit coupled to the channel estimate unit, a codebook store coupled to the quantization unit, and a transmitter coupled to the quantization unit. The channel estimate unit estimates a channel between the communications device and a controller serving the communications device, and the quantization unit quantizes the channel estimate based on a rank n codebook and outputs an index to a codeword from the rank n codebook based on a codeword selection mechanism. The codebook store stores the rank n codebook, and the transmitter transmits the index to the controller. The rank n codebook includes $2^K$ codewords with each codeword including n columns of a transformed base matrix of dimension $N_t \times N_t$, where K is a positive integer number representing a number of bits in the rank n codebook, and $N_t$ is a number of transmit antennas at the controller.

In accordance with another embodiment, a controller is provided. The controller includes a feedback decoder coupled to a signal input, a beamforming vector compute unit coupled to the feedback decoder, a transmit beamforming unit coupled to the beamforming vector compute unit and to a data input, and a transmitter coupled to the transmit beamforming unit and to an antenna. The feedback decoder decodes feedback information from a communications device to produce an index, where the index corresponds to a codeword in a rank n codebook, the codeword corresponds to a quantized version of channel state information for a communications channel between the controller and the communications device. The beamforming vector compute unit computes a beamforming vector from the codeword, the transmit beamforming unit applies the beamforming vector to data provided by the data input, and the transmitter transmits beamformed data provided by the transmit beamforming unit to a source of the feedback information using the antennas. The rank n codebook includes $2^K$ codewords with each codeword including n columns of a transformed base matrix of dimension $N_t \times N_t$, where K is a positive integer number representing a number of bits in the rank n codebook, and $N_t$ is a number of transmit antennas at the controller.

An advantage of an embodiment is that good quantization performance is achieved with a relatively small codebook, which may reduce resource requirements at both a transmitter and a receiver. Thereby reducing costs. Furthermore, a small codebook simplifies codebook search (quantization) times, therefore, performance improvements may be realized.

A further advantage of an embodiment is that although the codebook may have a relatively small number of codewords, coverage of a wide range of channel characteristics is provided.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a Third Generation Partnership Project (3GPP) Long Term Evolution (LTE) compliant wireless communications system that makes use of channel state information (CSI) with codebook quantization to improve overall capacity while reducing feedback overhead. The invention may also be applied, however, to other wireless communications systems, including those that are LTE-Advanced and WiMAX compliant.

Figure 1:
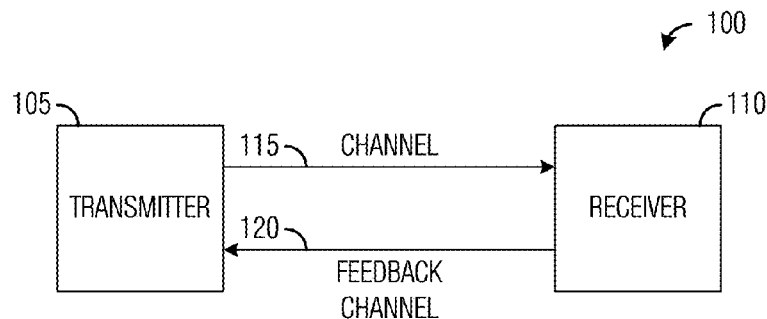
FIG. 1 is a diagram of a portion of a wireless communications system.

FIG. 1 illustrates a portion of a wireless communications system 100. Wireless communications system 100 includes a transmitter 105 and a receiver 110. Transmissions from transmitter 105 to receiver 110 occur over channel 115. Receiver 110 estimates channel 115 and provides information regarding channel 115 to transmitter 105, such as CSI discussed previously. Receiver 110 may utilize feedback channel 120 to transmit the information regarding channel 115 to transmitter 105.

In a typical communications system, transmitter 105 may be referred to as a base station (BS), base terminal station, controller, communications controller, nodeB, enhanced nodeB, and so on, while receiver 110 may be referred to as a mobile station (MS), terminal, user, user equipment, and so forth.

Since feedback information consumes communications system bandwidth, it may be common for a fraction of available communications system bandwidth to be dedicated for feeding back information. In order to accommodate limited feedback channel bandwidth, feedback information, e.g., CSI, is generally quantized into a digital format at receiver 110 before being fedback to transmitter 105. A codebook based quantization algorithm may be an efficient way to quantize the feedback information.

A generic codebook may consist of multiple codewords. In general, a codeword is selected based on certain selection criteria and a corresponding index to the codeword is fedback from receiver 110 to transmitter 105. Typically, the principles of codeword selection may be based on different precoding techniques. As an example, for rank-1 eigen-beamforming, a codeword may be selected to maximize expression $|HW_i|, i\epsilon[1, \ldots, N]$, where H denotes a generic channel matrix and N is a number of codewords in the codebook.

A challenge in codebook design may be to balance feedback overhead and quantization accuracy. Generally, the more codewords in a codebook, the better the channel quantization accuracy. However, a codebook with a large number of codewords also means increased feedback load. Furthermore, searching through a codebook with a large number of codewords generally takes more time to search through a codebook with a small number of codewords.

Another challenge in codebook design is to adequately cover a wide range of channel characteristics. For example, a correlated channel and an uncorrelated channel may have very different properties, and therefore, come with different codebook design criteria.

Figure 2A:
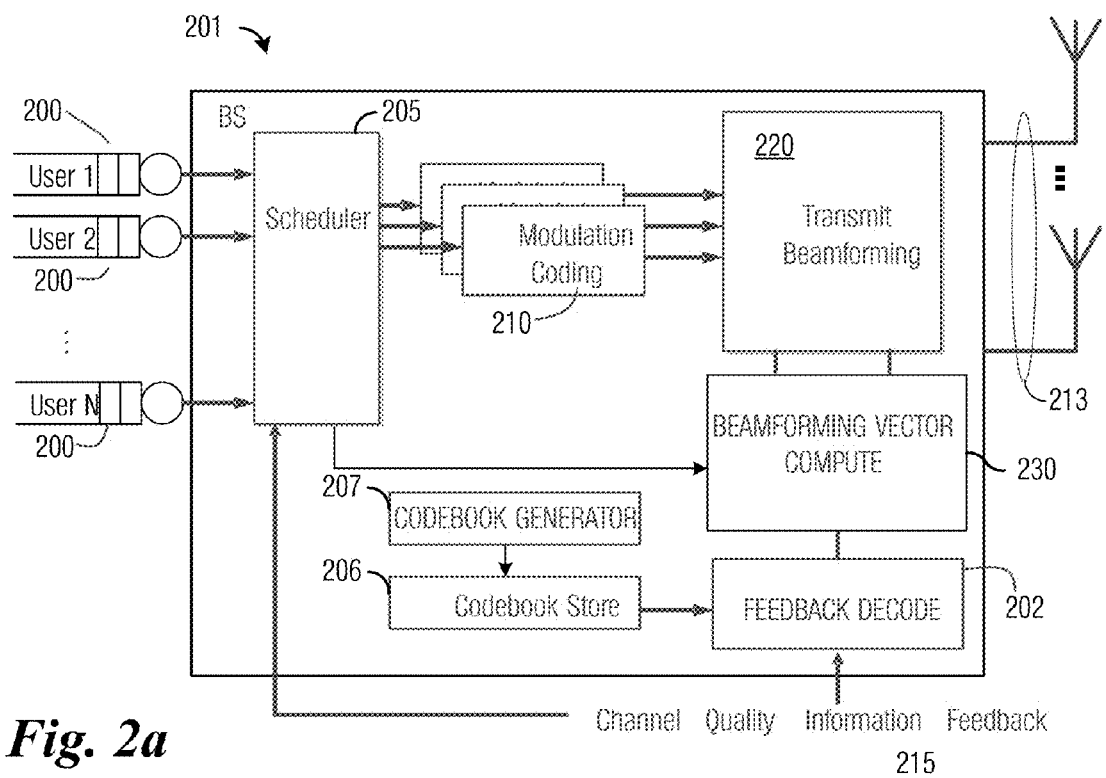
FIG. 2a is a diagram of a BS.

FIG. 2a illustrates a BS 201. Data 200 destined for a plurality of MSs being served, in the form of bits, symbols, or packets, for example, are sent to a scheduler 205, which decides which MSs will transmit or will receive in a given time/frequency opportunity. Data for MSs selected for reception are processed by modulation and coding block 210 to convert to transmitted symbols and add redundancy for the purpose of assisting with error correction or error detection. The modulation and coding scheme is chosen based in part on channel quality information feedback 215.

The output of modulation and coding block 210 may be passed to a transmit beamforming block 220, which maps the modulated and coded stream for each MS onto a beamforming vector. The beamformed outputs are coupled to antennas 213 through RF circuitry.

According to an embodiment, a feedback decode block 202 uses the indices to codewords contained in channel quality information feedback 215 combined with a codebook stored in codebook store 206 to reconstruct an estimate of the quantized channel state information. The output of feedback decode block 202 may be passed to beamforming vector compute unit 230 that may compute beamforming vectors for a transmission to a MS that is also a source of channel quality information feedback 215. The beamforming vectors may be in the form of a precoding matrix.

A codebook generator 207 coupled to codebook store 206 may be used to generate elements in a codebook stored in codebook store 206. For example, codebook generator 207 may apply a transformation to an existing codebook stored in codebook store 206. Alternatively, codebook generator 207 may adapt a baseline codebook or an already adapted codebook stored in codebook store 206. The information used in the transformation or adaptation of a codebook performed by codebook generator 207 may be preprogrammed in BS 201 or received by BS 201 during configuration or normal use and stored in codebook generator 207. For example, the information may be based on channel characteristics and/or a configuration of an antenna array used in transmissions. Alternatively, the information may be stored in a memory coupled to codebook generator 207.

Scheduler 205 may use any of the known scheduling disciplines in the literature including round robin, maximum sum rate, proportional fair, minimum remaining processing time, or maximum weighted sum rate. Generally scheduling decisions are based on channel quality information feedback 215 received from the plurality of MSs. Scheduler 205 may decide to send information to a single MS via transmit beamforming or may decide to serve multiple MSs simultaneously through multiuser MIMO communication.

Modulation and coding block 210 may use any number of coding and modulation techniques including quadrature amplitude modulation, phase shift keying, frequency shift keying, differential phase modulation, convolutional coding, turbo coding, bit interleaved convolutional coding, low density parity check coding, fountain coding, or block coding. The choice of modulation and coding rate in a preferred embodiment is made based on channel quality information feedback 215 and may be determined jointly in the scheduler 205.

While not explicitly illustrated, it is obvious to those skilled in the art that orthogonal frequency division multiplexed (OFDM) modulation can be used. Further, any number of multiple access techniques could be used including orthogonal frequency division multiple access, code division multiple access, frequency division multiple access, or time division multiple access. The multiple access technique may be combined with the modulation and coding block 210 or the transmit beamforming block 220 among others.

Channel quality information feedback 215 may, for purposes of illustration, be in the form of quantized channel measurements, modulation, coding, and/or spatial formatting decisions, received signal strength, and signal-to-interference-plus-noise measurements. A detailed discussion of operations in BS 201 is provided below.

Figure 2B:
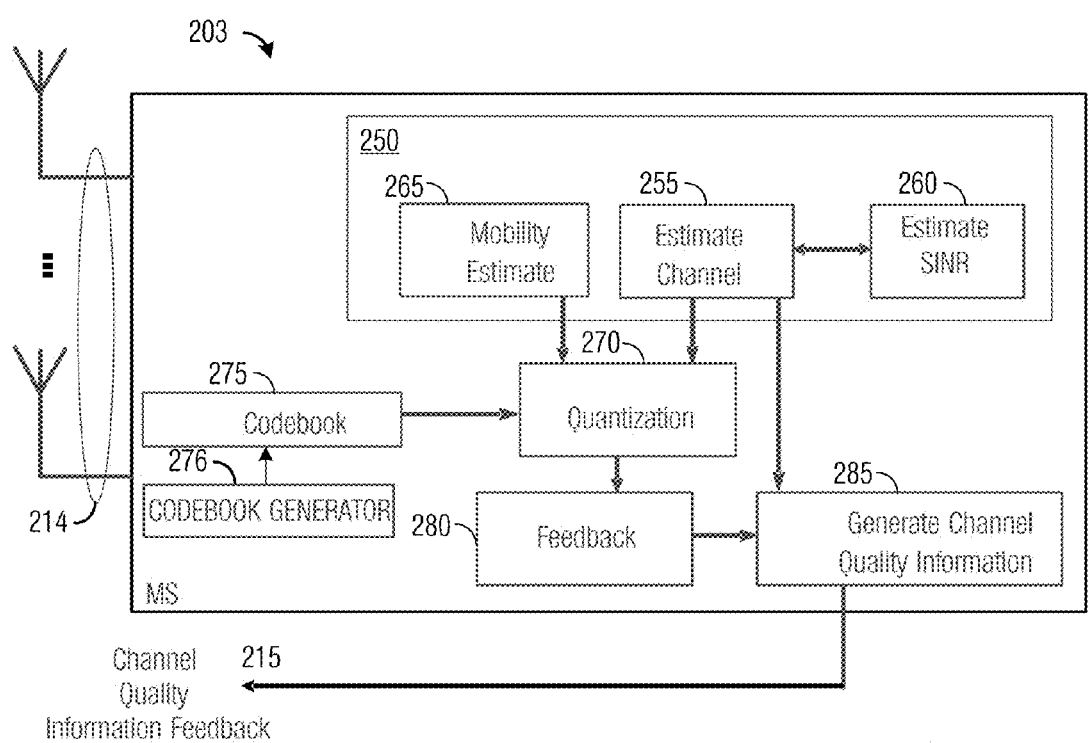
FIG. 2b is a diagram of a MS.

FIG. 2b illustrates MS 203. MS 203 may have one or more receive antennas 214, connecting through RF circuitry to a receiver signal processing block 250. Some of the key operations performed by receiver signal processing block 250 include channel estimation block 255, estimate signal plus interference to noise ratio (SINR) block 260, and a mobility estimate block 265.

Channel state information may be quantized using a quantization block 270 as described in the embodiments. Quantization block 270 quantizes an input signal to a codebook stored in codebook store 275. A codebook generator 276 coupled to codebook store 275 may be used to generate elements in a codebook stored in codebook store 275. Codebook generator 276 may also be used to transform or adapt a codebook stored in codebook store 275. According to an embodiment, the codebook stored in codebook store 275 may be identical to the codebook stored in codebook store 206. Additionally, a transformation or adaptation performed by codebook generator 276 may be identical to a transformation or adaptation performed by codebook generator 207. An index to a codeword from the codebook related to the input signal may be output from quantization block 270.

An estimate of the amount of channel variation, produced by mobility estimate block 265, may be used to improve a quantization algorithm used in quantization block 270. Feedback block 280 may be used to generate an index to a codeword in the codebook (i.e., a codebook index). Generate channel quality information block 285 may generate a new feedback message from the codebook index output from quantization block 270. Generate channel quality information block 285 may also generate a special feedback control message as channel quality information feedback 215.

Channel estimation block 255 may employ any number of algorithms known in the art including least squares, maximum likelihood, maximum a postiori, Bayes estimator, adaptive estimator, or a blind estimator. Some algorithms exploit known information inserted into the transmit signal in the form of training signals or training pilots, while others use a structure in the transmitted signal such as cyclostationarity to estimate coefficients of the channel between the BS and MS 203.

Estimate SINR block 260 may produce a measure of performance corresponding to the desired signal. According to an embodiment the measure consists of a received signal power to interference plus noise estimate. According to another embodiment, estimate SINR block 260 provides an estimate of the received signal-to-noise ratio. According to yet another embodiment, estimate SINR block 260 provides an estimate of the average received signal power, averaged over subcarriers in an OFDM system. A detailed discussion of operations in MS 203 is provided below.

Figure 3:
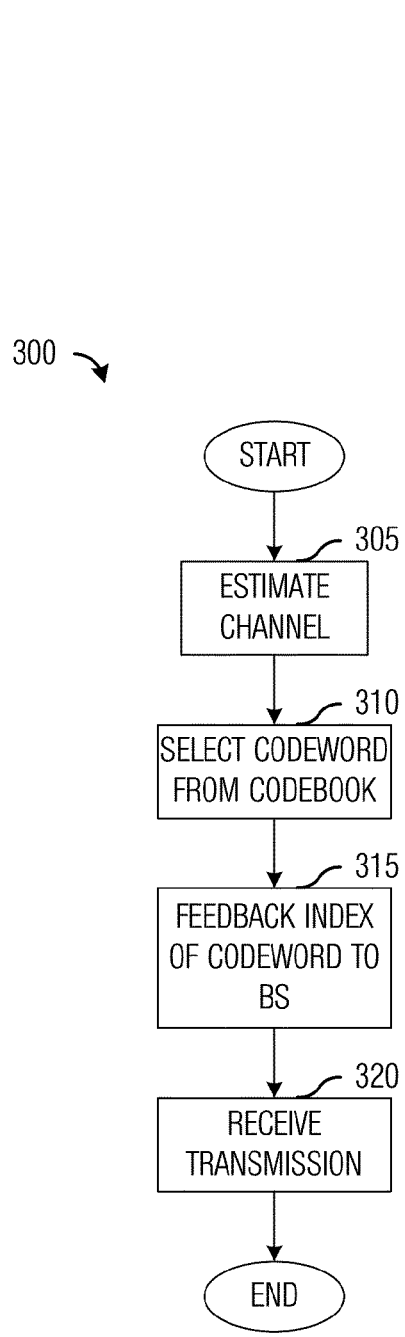
FIG. 3 is a flow diagram of MS operations for providing feedback information.

FIG. 3 illustrates a flow diagram of MS operations 300 for providing feedback information. MS operations 300 may be indicative of operations occurring in a MS, such as MS 203, as the MS reports feedback information, such as CSI, to a BS, such as BS 201. MS operations 300 may occur periodically as specified in a technical standard or description of a communications system wherein the MS and the BS operate. Alternatively, MS operations 300 may occur each time the MS receives a transmission from the BS, each time the MS receives a special transmission from the BS, when a specified metric (such as an error rate, successful transmission rate, or so forth) meets a specified threshold, and so forth.

MS operations 300 may begin with the MS estimating a channel between the MS and the BS (block 305). According to an embodiment, the MS may estimate a channel, such as channel 115, based on measurements of a pilot or a reference signal transmitted by the BS. Alternatively, the MS may estimate the channel based on measurements of transmissions made by the BS over a window of time.

Based on the estimated channel, the MS may select a codeword from a codebook based on a codeword selection mechanism (block 310). The MS may select a codeword from a codebook stored in codebook store 275, for example. According to an embodiment, a K-bit codebook having $2^K$ codewords may be used by the MS.

Let the selected codeword be denoted $W_s$, which may be expressed as:

$$W_s = F_{CS}(W),$$

where $F_{CS}(\bullet)$ is a generic codeword selection mechanism and may be based on a precoding technique being used. For example, for rank-1 eigen-beamforming, the codeword selection mechanism may be defined as:

$$F_{CS}(W) = \max(|HW_i|, i \in [0, \ldots, 2^K-1]),$$

where H denotes the channel matrix representing the estimated channel.

Let $W=[W_1; \ldots; W_{2^K}]$ denote the K-bit codebook in which $W_i, i \in [0, \ldots, 2^K-1]$ is the i-th codeword of the codebook W. Some variations of W exist that may have the same properties as W. For example, let a variation of W be denoted $\hat{W}_i = D_i W_i$, where $D_i$ is a phase rotation diagonal matrix for the i-th codeword of W and may be expressed as:

$$D_i = \begin{bmatrix} e^{j\theta_{i1}} & 0 & \cdots & 0 \\ 0 & e^{j\theta_{i2}} & \ddots & \vdots \\ \vdots & \ddots & \ddots & 0 \\ 0 & \cdots & 0 & e^{j\theta_{ir_i}} \end{bmatrix},$$

in which $\theta_{ik}, k \in [0, r_i)$ is an arbitrary phase rotation between 0 and $2\pi$, and denotes the phase rotation of the k-th row vector of the codeword $W_i$, and $r_i$ represents the rank of $W_i$. $\hat{W}_i$, as a phase rotated version of $W_i$, does not change the property of $W_i$.

According to an embodiment, let an i-th codeword of a K-bit rank-1 codebook for $N_t$ transmit antennas may be denoted $W_{K,N_t}^1(i) = C_{K,N_t}^i(1,:)$ and is the first column of an $N_t \times N_t$ matrix $\hat{C}_{K,N_t}^i$, which is given by expression $$C_i = \text{diag}(u_i) \times \text{DFT}_{N_t},$$

where $u_i$ may be based on channel characteristics and/or antenna array configuration and $\text{DFT}_{N_t}$ is the $N_t \times N_t$ Discrete Fourier Transform (DFT) matrix, where an element in row p and column q of $DFT_{N_t}$ may be expressed as $$DFT_{N_t}(p,q) = \frac{1}{\sqrt{N_t}} e^{\frac{2\pi pq}{N_t}j}.$$

As shown in the expression for $C_i$, $\text{diag}(u_i)$ may be a transformation applied to a codebook (i.e., $DFT_{N_t}$) stored in codebook store 275 by codebook generator 276 with transformation $\text{diag}(u_i)$ being stored in codebook generator 276 or a memory coupled to codebook generator 276. According to an embodiment, $u_i(n) = e^{j\pi \sin(k \sin(\theta_i))n}$, in which k is a constant and $\theta_i \in [0, 2\pi]$, $i \in [0, \ldots, 2^K-1]$, $n \in [0, \ldots, N_t-1]$. Preferred values for k and $\theta_i$ include $$k = \frac{2\sqrt{3}\pi}{9} \text{ and } \theta_i = -\frac{\pi}{3} + \frac{2i\pi}{45},$$
$$i \in [0, \ldots, 2^K - 1],$$
$$n \in [0, \ldots, N_t - 1].$$

Based on the definition of the codebook and the transformation, a generator for a K-bit rank-1 codebook may be summarized as shown in Table 1.

TABLE 1

| Rank-1 Codebook Generator | | |
|---|---|---|
| | codeword index | codeword |
| $u_i$ $i \in [0, \ldots, (2^K-1)]$ | i | $C_{K,N_t}^i(1,:)$ |

Similarly, a generator for a K-bit rank-2 codebook for $N_t$ transmit antennas may be denoted $W_{K,N_t}^2(i)$ and consists of two columns of $C_{K,N_t}^i$. In general, an i-th codeword for the K-bit rank-2 codebook may be expressed as $$W_{K,N_t}^1(i) = C_{K,N_t}^i(1,j;:)/\sqrt{2},$$

where $i \in [1, \ldots, 2^K]$ and $j \in [2, \ldots, N_t]$ and may depend on K and $N_t$. In a situation when $N_t=8$, K=6, the rank-2 codebook may be generated as shown in Table 2 below.

TABLE 2

| Rank-2 Codebook Generator | | |
|---|---|---|
| | codeword index | codeword |
| $u_i$ $i \in [0, \ldots, 15]$ | 4i | $C_{K,N_t}^i(1:2,:)/\sqrt{2}$ |
| | 4i + 1 | $C_{K,N_t}^i(1:4,:)/\sqrt{2}$ |
| | 4i + 2 | $C_{K,N_t}^i(1:6,:)/\sqrt{2}$ |
| | 4i + 3 | $C_{K,N_t}^i(1:8,:)/\sqrt{2}$ |

The above discussed codebook generators may generate codebooks of any size for any number of transmit antennas. The codebook generators may be used to generate rank-1 and rank-2 codebooks for both single user multiple input, multiple output (SU-MIMO) and multiuser MIMO (MU-MIMO), respectively. Furthermore, the channel quantization better reflects the physical realization of the channel. Good tradeoff between feedback overhead and quantization accuracy is also achieved.

The MS may then feedback to the BS over a feedback channel, such as feedback channel 120, an index to the selected codeword (block 315). The MS may then receive a transmission from the BS, wherein the transmission is precoded using beamforming vectors derived based on the index fedback to the BS (block 320). MS operations 300 may then terminate.

Figure 4:
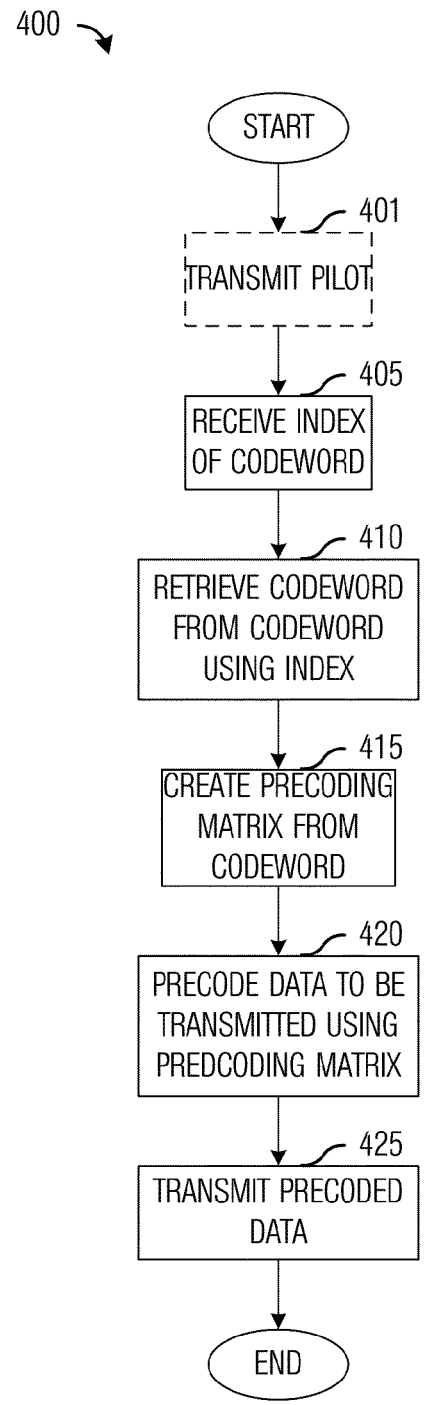
FIG. 4 is a flow diagram of BS operations for transmitting information.

FIG. 4 illustrates a flow diagram of BS operations 400 for transmitting information. BS operations 400 may be indicative of operations occurring in a BS, such as a BS 201, as the BS transmits information to a MS, such as MS 203. BS operations 400 may occur when the BS has a transmission for the MS and when the BS is allowed to transmit.

BS operations 400 may begin with the BS transmitting a pilot or reference sequence (block 401). The pilot may be a special sequence transmitted by the BS to assist MSs served by the BS to estimate a communications channel between the BS and the MS. The transmission of the pilot may be an optional operation for the BS.

The BS may receive an index, index(s), to a codeword, $W_s$, from the MS over a feedback channel, such as feedback channel 120 (block 405). The codeword $W_s$ may be a quantized version of an estimated CSI and may be selected from a codebook by the MS, with both the BS and the MS utilizing the same codebook. The codeword $W_s$ may represent a partial CSI of a channel between the BS and the MS.

According to an embodiment, let an i-th codeword of a K-bit rank-1 codebook for $N_t$ transmit antennas used for CSI quantization by the MS and also used by the BS be denoted $W_{K,N_t}^1(i) = C_{K,N_t}^i(1,:)$ and is the first column of an $N_t \times N_t$ matrix $C_{K,N_t}^i$, which is given by expression $$C_i = \text{diag}(u_i) \times DFT_{N_t},$$

where $u_i$ may be based on channel characteristics and/or antenna array configuration and $DFT_{N_t}$ is the $N_t \times N_t$ Discrete Fourier Transform (DFT) matrix, where an element in row p and column q of $DFT_{N_t}$ may be expressed as $$DFT_{N_t}(p,q) = \frac{1}{\sqrt{N_t}} e^{\frac{2\pi pq}{N_t}j}.$$

According to an embodiment, $u_i(n) = e^{j\pi \sin(k \sin(\theta_i))n}$ in which k is a constant, and $\theta_i \in [0, 2\pi]$, $i \in [0, \ldots, 2^K-1]$, $n \in [0, \ldots, N_t-1]$, with preferred values for k and $\theta_i$ being $$k = \frac{2\sqrt{3}\pi}{9} \text{ and } \theta_i = -\frac{\pi}{3} + \frac{2i\pi}{45},$$
$$i \in [0, \ldots, 2^K - 1],$$
$$n \in [0, \ldots, N_t - 1].$$

In general, the BS may receive feedback from various MSs. In such a situation, the feedback index of an i-th MS is expressed as $\text{index}(s,i), i \in [1, \ldots, N]$, where N is the number of MSs associated with the BS. The feedback codeword from the i-th MS is then denoted as $W_s^i, i \in [1, \ldots, N]$.

The BS may utilize the index received from the MS to retrieve a codeword corresponding to the quantized version of the estimated CSI (block 410). The BS may use the codeword to create a precoding matrix P (block 415).

Based on $W_s^i, i \in [1, \ldots, N]$, the precoding matrix P at the BS may be expressed as:

$$P = [p_1, \ldots, p_M]_{N_T \times M} = F_{PG}(W_s^i, i \in [1, \ldots, N]),$$

where P is a $N_T \times M$ matrix in which $N_T$ is the number of transmit antennas and M represents the number of symbols transmitted simultaneously, and $F_{PG}(\bullet)$ denotes a generic precoding matrix generation mechanism.

The BS may use the precoding matrix P to precode data to be transmitted to the MS (block 420). Based on the precoding matrix P, the information symbols (denoted d) can be precoded and then transmitted by the BS to the MS (block 425). BS operations 400 may then terminate.

At the i-th MS, the received precoded transmission (denoted $\hat{d}$) may be expressed as $\hat{d}=H_i Pd+N_I+N_{AWGN}$, where $H_i$ represents the channel between the BS and the MS, and $N_I$ and $N_{AWGN}$ are the interference and additive white Gaussian noise (AWGN), respectively.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for communications device operations, the method comprising:
   estimating, by the communications device, a channel between a controller and a mobile device;
   generating channel state information from the channel estimate;
   quantizing the channel state information by selecting a codeword from a rank n codebook in accordance with a codeword selection mechanism, where n is a non-negative integer value;
   transmitting an index corresponding to the selected codeword; and
   receiving a transmission from the controller, wherein the transmission is precoded in accordance with the index,
   wherein the rank n codebook comprises $2^K$ codewords with each codeword comprising n columns of a transformed base matrix of dimension $N_t \times N_t$, where K is a positive integer number representing a number of bits in the rank n codebook, and $N_t$ is a number of transmit antennas at the controller, and
   wherein an i-th codeword of the rank n codebook is expressible as $C_i=\text{diag}(u_i) \times DFT_{N_t}$, where $DFT_{N_t}$ is the base matrix, $u_i(n)=e^{j\pi \sin(k \sin(\theta_i))n}$, $i\in[0,\ldots,2^K-1]$, $n\in[0,\ldots,N_t-1]$, k is a constant, $\theta_i\in[0,2\pi]$, and diag( ) is a function that returns diagonal elements of $u_i$.

2. The method of claim 1, wherein the channel is estimated in accordance with a measurement of a pilot transmitted on the channel.

3. The method of claim 1, wherein n is equal to one, and wherein $$k=\frac{2\sqrt{3}\pi}{9}.$$

4. The method of claim 3, wherein $$\theta_i=-\frac{\pi}{3}+\frac{2i\pi}{45}.$$

5. The method of claim 1, wherein n is equal to one, and wherein the rank 1 codebook is generated using generator

| | codeword index | codeword |
|---|---|---|
| $u_i$ $i \in [0,\ldots,(2^K-1)]$. | i | $C_{K,N_t}^i(1,:)$ |

6. The method of claim 1, wherein n is equal to one, and wherein the i-th codeword of the rank 1 codebook is a first column of the transformed base matrix.

7. The method of claim 1, wherein n is equal to two, and wherein an i-th codeword of the rank 2 codebook is expressible as $$W_{K,N_t}^1(i)=C_{K,N_t}(1:j,:)/\sqrt{2},$$

where $i\in[1,\ldots,2^K]$ and $j\in[2,\ldots,N_t]$.

8. The method of claim 7, wherein $N_t=8$, K=6, and the rank 2 codebook is generated using generator

| | codeword index | codeword |
|---|---|---|
| $u_i$ $i \in [0,\ldots,15]$ | 4i | $C_{K,N_t}^i(1:2,:)/\sqrt{2}$ |
| | 4i + 1 | $C_{K,N_t}^i(1:4,:)/\sqrt{2}$ |
| | 4i + 2 | $C_{K,N_t}^i(1:6,:)/\sqrt{2}$ |
| | 4i + 3 | $C_{K,N_t}^i(1:8,:)/\sqrt{2}$. |

9. The method of claim 1, wherein n is equal to two, and wherein the i-th codeword of the rank 2 codebook comprises two columns of the transformed base matrix.

10. The method of claim 1, wherein an element in row p and column q of the $DFT_{N_t}$ base matrix is expressible as $$DFT_{N_t}(p,q)=\frac{1}{\sqrt{N_t}}e^{\frac{2\pi pq}{N_t}j},$$

where p and q are positive integer values less than or equal to $N_t$.

11. The method of claim 1, wherein the codeword selection mechanism is expressible as $$F_{CS}(W)=\max(|HW_i|,i\in[0,\ldots,2^K-1]),$$

where H is a channel estimate, $W_i$ is an i-th codeword in the rank n codebook, and K is the number of bits of the rank n codebook.

12. A method for controller operation, the method comprising:
   receiving, by the controller, an index from a communications device, the index corresponding to a codeword in a rank n codebook, and the codeword representing a quantized channel estimate, where n is a non-negative integer value representing a number of transmit antennas at a controller;
computing a precoding matrix from the codeword;
precoding data to be transmitted to the communications device in accordance with the precoding matrix; and
transmitting the precoded data to the communications device,
wherein the rank n codebook comprises $2^K$ codewords with each codeword comprising n columns of a transformed base matrix of dimension $N_t \times N_t$, where K is a positive integer number representing a number of bits in the rank n codebook, and $N_t$ is a number of transmit antennas at the controller, and
wherein an i-th codeword of the rank n codebook is expressible as $C_i = \text{diag}(u_i) \times DFT_{N_t}$, where $DFT_{N_t}$ is the base matrix, $u_i(n) = e^{j\pi \sin(k \sin(\theta_i))n}$, $i \in [0, \ldots, 2^K-1]$, $n \in [0, \ldots, N^t-1]$, k is a constant, and $\theta_i \in [0, 2\pi]$, and diag( ) is a function that returns diagonal elements of $u_i$.

13. The method of claim 12, further comprising transmitting a pilot.

14. The method of claim 12, wherein n is equal to one, and wherein $$k = \frac{2\sqrt{3}\pi}{9},$$

$$\theta_i = -\frac{\pi}{3} + \frac{2i\pi}{45},$$

$$i \in [0, \ldots, 2^K - 1],$$

and $n \in [0, \ldots, N_t - 1]$.

15. The method of claim 12, wherein n is equal to two and $N_t = 8$, K=6, and the rank 2 codebook is generated using generator

| | codeword index | codeword |
|---|---|---|
| $u_i$ | 4i | $C_{K,N_t}^i(1:2,:)/\sqrt{2}$ |
| $i \in [0, \ldots, 15]$ | 4i + 1 | $C_{K,N_t}^i(1:4,:)/\sqrt{2}$ |
| | 4i + 2 | $C_{K,N_t}^i(1:6,:)/\sqrt{2}$ |
| | 4i + 3 | $C_{K,N_t}^i(1:8,:)/\sqrt{2}$. |

16. A communications device comprising:
a channel estimate unit coupled to a signal input, the channel estimate unit configured to estimate a channel between the communications device and a controller serving the communications device;
a quantization unit coupled to the channel estimate unit, the quantization unit configured to quantize the channel estimate in accordance with a rank n codebook and to output an index to a codeword from the rank n codebook in accordance with a codeword selection mechanism;
a codebook store coupled to the quantization unit, the codebook store configured to store the rank n codebook; and
a transmitter coupled to the quantization unit, the transmitter configured to transmit the index to the controller,
wherein the rank n codebook comprises $2^K$ codewords with each codeword comprising n columns of a transformed base matrix of dimension $N_t \times N_t$, where K is a positive integer number representing a number of bits in the rank n codebook, and $N_t$ is a number of transmit antennas at the controller, and
wherein an i-th codeword of the rank n codebook is expressible as $C_i = \text{diag}(u_i) \times DFT_{N_t}$, where $DFT_{N_t}$ is the base matrix, $u_i(n) = e^{j\pi \sin(\theta_i)n}$, $i \in [0, \ldots, 2^K-1]$, $n \in [0, \ldots, N_t-1]$, k is a constant, $\theta_i \in [0, 2\pi]$, and diag( ) is a function that returns diagonal elements of $u_i$.

17. The communications device of claim 16, wherein the channel estimate unit is configured to estimate the channel in accordance with a measurement of a pilot transmitted on the channel.

18. The communications device of claim 16, wherein n is equal to one, and wherein the i-th codeword of the rank 1 codebook is a first column of the transformed base matrix.

19. The communications device of claim 16, wherein n is equal to two, and wherein the i-th codeword of the rank 2 codebook comprises two columns of the transformed base matrix.

20. A controller comprising:
a feedback decoder coupled to a signal input, the feedback decoder configured to decode feedback information from a communications device to produce an index, where the index corresponds to a codeword in a rank n codebook, the codeword corresponding to a quantized version of channel state information for a communications channel between the controller and the communications device;
a beamforming vector compute unit coupled to the feedback decoder, the beamforming vector compute unit configured to compute a beamforming vector from the codeword;
a transmit beamforming unit coupled to the beamforming vector compute unit and to a data input, the transmit beamforming unit configured to apply the beamforming vector to data provided by the data input; and
a transmitter coupled to the transmit beamforming unit and to an antenna, the transmitter configured to transmit beamformed data provided by the transmit beamforming unit to a source of the feedback information using the antennas,
wherein the rank n codebook comprises $2^K$ codewords with each codeword comprising n columns of a transformed base matrix of dimension $N_t \times N_t$, where K is a positive integer number representing a number of bits in the rank n codebook, and $N_t$ is a number of transmit antennas at the controller, and
wherein an i-th codeword of the rank n codebook is expressible as $C_i = \text{diag}(u_i) \times DFT_{N_t}$, where $DFT_{N_t}$ is the base matrix, $u_i(n) = e^{j\pi \sin(k \sin(\theta_i))n}$, $i \in [0, \ldots, 2^K-1]$, $n \in [0, \ldots, N_t-1]$, k is a constant, $\theta_i \in [0, 2\pi]$, and diag( ) is a function that returns diagonal elements of $u_i$.

21. The controller of claim 20, wherein the transmitter is further configured to transmit a pilot.

22. The controller of claim 20, wherein n is equal to one, and wherein $$k = \frac{2\sqrt{3}\pi}{9}, \theta_i = -\frac{\pi}{3} + \frac{2i\pi}{45}, i \in [0, \ldots, 2^K - 1], \text{ and } n \in [0, \ldots, N_t - 1].$$

23. The controller of claim 20, wherein n is equal to two and $N_t = 8$, K=6, and the rank 2 codebook is generated using generator

| | codeword index | codeword |
|---|---|---|
| $u_i$ | $4i$ | $C_{K,N_t}^i(1:2,:)/\sqrt{2}$ |
| $i \in [0, \ldots, 15]$ | $4i+1$ | $C_{K,N_t}^i(1:4,:)/\sqrt{2}$ |
| | $4i+2$ | $C_{K,N_t}^i(1:6,:)/\sqrt{2}$ |
| | $4i+3$ | $C_{K,N_t}^i(1:8,:)/\sqrt{2}$. |

\* \* \* \* \*

UNITED STATES PATENT AND TRADEMARK OFFICE
CERTIFICATE OF CORRECTION

| | | |
|---|---|---|
| PATENT NO. | : 8,477,859 B2 | Page 1 of 1 |
| APPLICATION NO. | : 12/730064 | |
| DATED | : July 2, 2013 | |
| INVENTOR(S) | : Tang et al. | |

It is certified that error appears in the above-identified patent and that said Letters Patent is hereby corrected as shown below:

In the Claims:

Column 10, Claim 5, Line 18, delete "$C_{K,N_t}{}'(1,:)$" and insert $C^i_{K,N_t}(1,:)$ --.

Column 10, Claim 7, Line 29, delete "$W_{K,N}{}^1(i) = C_{K,N_t}(1:j,:)/\sqrt{2},$" and Insert -- $W^1_{K,N_t}(i) = C^i_{K,N_t}(1:j,:)/\sqrt{2},$ --.

Column 10, Claim 8, Line 38, delete "$C_{K,N_t}{}'(1:2,:)/\sqrt{2}$" and insert -- $C^i_{K,N_t}(1:2,:)/\sqrt{2}$ --.

Column 10, Claim 8, Line 39, delete "$C_{K,N_t}{}'(1:4,:)/\sqrt{2}$" and insert -- $C^i_{K,N_t}(1:4,:)/\sqrt{2}$ --.

Column 10, Claim 8, Line 40, delete "$C_{K,N_t}{}'(1:6,:)/\sqrt{2}$" and insert -- $C^i_{K,N_t}(1:6,:)/\sqrt{2}$ --.

Column 10, Claim 8, Line 41, delete "$C_{K,N_t}{}'(1:8,:)/\sqrt{2}$" and insert -- $C^i_{K,N_t}(1:8,:)/\sqrt{2}$ --.

Column 11, Claim 12, Line 17, delete "$u_i(n) = e^{j\pi \sin(k \sin(\theta_i))n}$" and insert -- $u_i(n) = e^{j\pi \sin(k \sin(\theta_i))n}$ --.

Column 11, Claim 12, Line 18, delete "$N' - 1$" and insert -- $N_t - 1$ --.

Column 11, Claim 15, Line 42, delete "$C_{K,N_t}{}'(1:2,:)/\sqrt{2}$" and insert -- $C^i_{K,N_t}(1:2,:)/\sqrt{2}$ --.

Column 11, Claim 15, Line 43, delete "$C_{K,N_t}{}'(1:4,:)/\sqrt{2}$" and insert -- $C^i_{K,N_t}(1:4,:)/\sqrt{2}$ --.

Column 11, Claim 15, Line 44, delete "$C_{K,N_t}{}'(1:6,:)/\sqrt{2}$" and insert -- $C^i_{K,N_t}(1:6,:)/\sqrt{2}$ --.

Column 11, Claim 15, Line 45, delete "$C_{K,N_t}{}'(1:8,:)/\sqrt{2}$" and insert -- $C^i_{K,N_t}(1:8,:)/\sqrt{2}$ --.

Column 12, Claim 16, Line 3, delete "$u_i(n) = e^{j\pi \sin(\theta_i))n}$" and insert -- $u_i(n) = e^{j\pi \sin(k \sin(\theta_i))n}$ --.

Column 12, Claim 20, Line 52, delete "$u_i(n) = e^{j\pi \sin(k \sin(\theta_i))n}$" and insert -- $u_i(n) = e^{j\pi \sin(k \sin(\theta_i))n}$ --.

Column 13, Claim 23, Line 5, delete "$C_{K,N}{}'(1:2,:)/\sqrt{2}$" and insert -- $C^i_{K,N_t}(1:2,:)/\sqrt{2}$ --.

Column 13, Claim 23, Line 6, delete "$C_{K,N}{}'(1:4,:)/\sqrt{2}$" and insert -- $C^i_{K,N_t}(1:4,:)/\sqrt{2}$ --.

Column 13, Claim 23, Line 7, delete "$C_{K,N}{}'(1:6,:)/\sqrt{2}$" and insert -- $C^i_{K,N_t}(1:6,:)/\sqrt{2}$ --.

Column 13, Claim 23, Line 8, delete "$C_{K,N}{}'(1:8,:)/\sqrt{2}$" and insert -- $C^i_{K,N_t}(1:8,:)/\sqrt{2}$ --.

Signed and Sealed this
Eighth Day of October, 2013

Teresa Stanek Rea
*Deputy Director of the United States Patent and Trademark Office*